United States Patent [19]

Gill, Jr. et al.

[11] 4,143,688

[45] Mar. 13, 1979

[54] APPARATUS FOR SELECTIVELY DISPENSING PASTY SUBSTANCES

[76] Inventors: Robert E. Gill, Jr., 23855 David Dr., Suite 202C, North Olmstead, Ohio 44070; Michael Williams, 704 Second National Tower, Warren, Ohio 44481

[21] Appl. No.: 768,049

[22] Filed: Feb. 14, 1977

[51] Int. Cl.² .................................. B67D 3/00
[52] U.S. Cl. .................................. 141/104; 141/243; 222/136; 222/144.5; 222/486
[58] Field of Search .................. 222/135, 136, 144.5, 222/185, 394, 486, 330; 141/67, 100, 104, 234, 237, 242, 243; 99/352, 450.7

[56] References Cited

U.S. PATENT DOCUMENTS

| 14,703 | 4/1856 | Risher | 222/276 X |
|---|---|---|---|
| 1,294,579 | 2/1919 | Waring | 141/242 |
| 2,026,818 | 1/1936 | Bonney | 222/394 X |
| 3,258,159 | 6/1966 | Neville et al. | 222/276 X |
| 3,439,841 | 4/1969 | Rhodes | 222/142.9 X |
| 3,695,486 | 10/1972 | Warner | 141/242 X |
| 3,760,989 | 9/1973 | Morine et al. | 222/276 |
| 3,902,637 | 9/1975 | Scheeler | 222/144.5 |
| 3,987,824 | 10/1976 | Zehnder | 141/104 X |
| 4,088,249 | 5/1978 | Westling | 222/486 |

FOREIGN PATENT DOCUMENTS

261595  11/1926  Canada .................................. 222/144.5

Primary Examiner—Stanley H. Tollberg
Assistant Examiner—Fred A. Silverberg
Attorney, Agent, or Firm—Michael Williams

[57] ABSTRACT

Apparatus for dispensing pasty flowable substances, and particularly for dispensing substances such as mustard and catsup for deposit on buns. The apparatus comprises a closed container having a plurality of compartments for containing mustard and catsup. A valve arrangement is associated with the container to uncover selected openings in compartments, and air under slight pressure is introduced into the container to assist in ejecting the mustard or catsup. A control is included to selectively provide for ejection of mustard, or catsup, or both.

2 Claims, 14 Drawing Figures

APPARATUS FOR SELECTIVELY DISPENSING PASTY SUBSTANCES

BACKGROUND AND SUMMARY

The prior art contains considerable apparatus for dispensing a variety of material but, insofar as we are aware, apparatus for selectively dispensing pasty substances such as mustard and catsup, or a selected one of the two, is novel in the art.

Our improved apparatus comprises a closed container having a plurality of compartments for mustard and catsup. The apparatus is well suited for use in fast food service operations for use in dispensing mustard and catsup on hamburger buns which are carried on a tray disposed beneath the container. Mustard and catsup, or a selected one of the two, may be deposited on a dozen, or a half dozen buns, in very quick order.

A push button arrangement is provided so that an operator may quickly select which substance is to be deposited on the buns, and merely by a press of the selected push button, may actuate controls to quickly eject the substance on the buns.

DESCRIPTION OF THE DRAWINGS

In the drawings accompanying this specification and forming a part of this application, there is shown, for purpose of illustration, an embodiment which our invention may assume, and in these drawings.

DESCRIPTION OF THE PREFERRED EMBODIMENT

Figure 1:
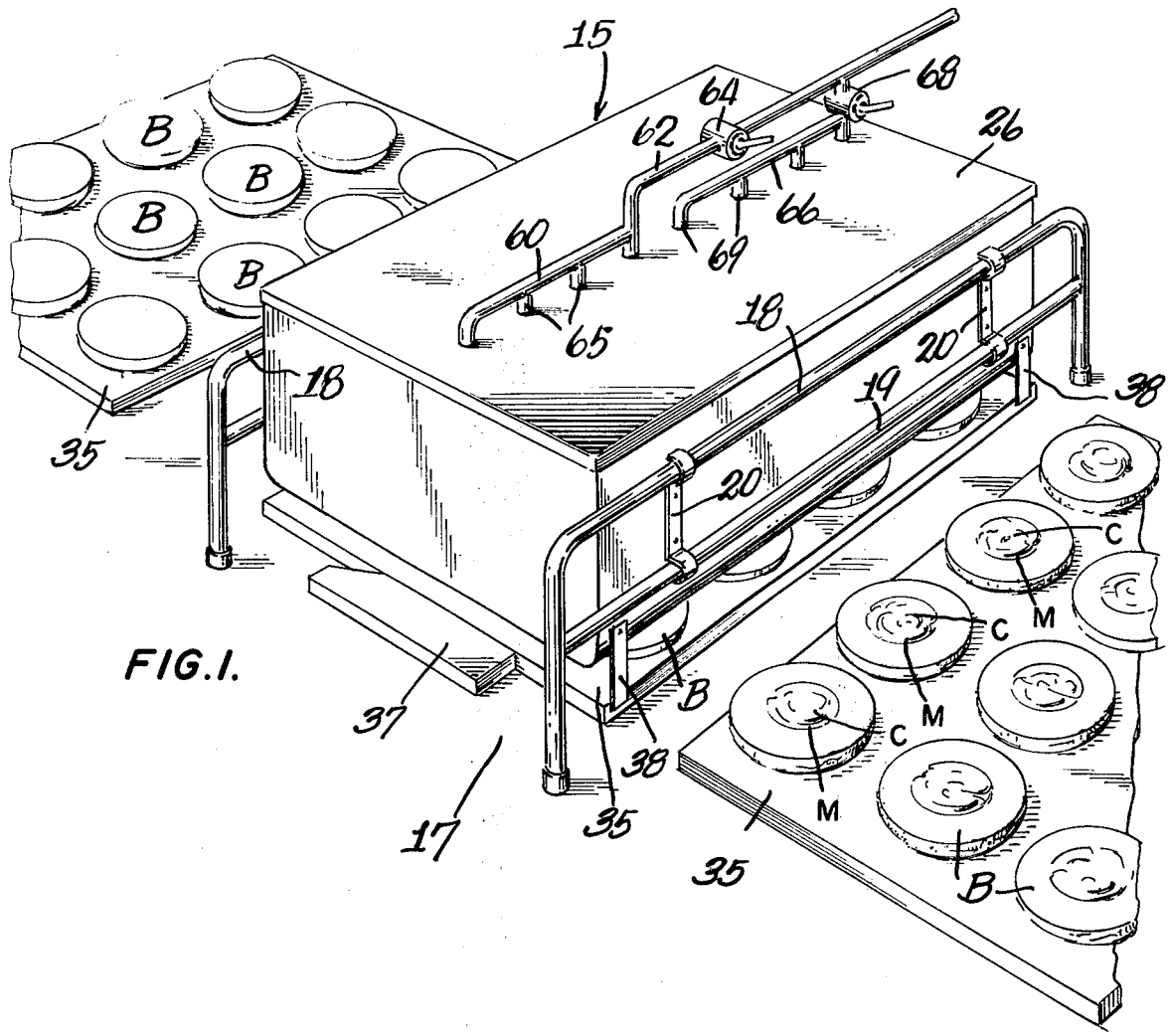
FIG. 1 is a perspective view of apparatus incorporating the preferred embodiment of our invention.
Figure 2:
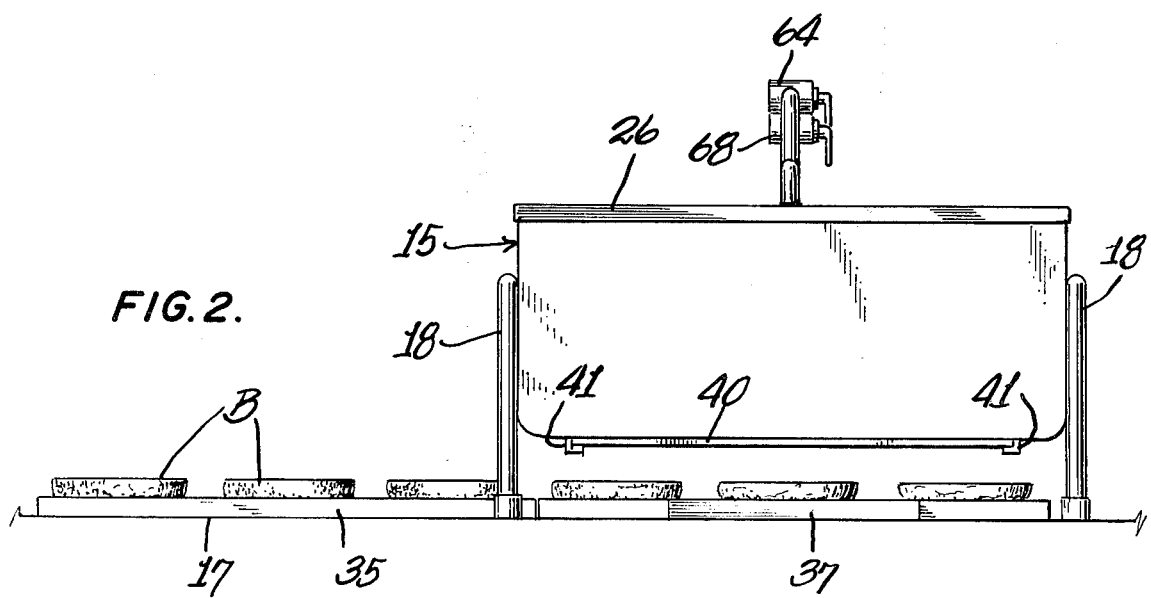
FIG. 2 is an end elevational view of the apparatus.
Figure 3:
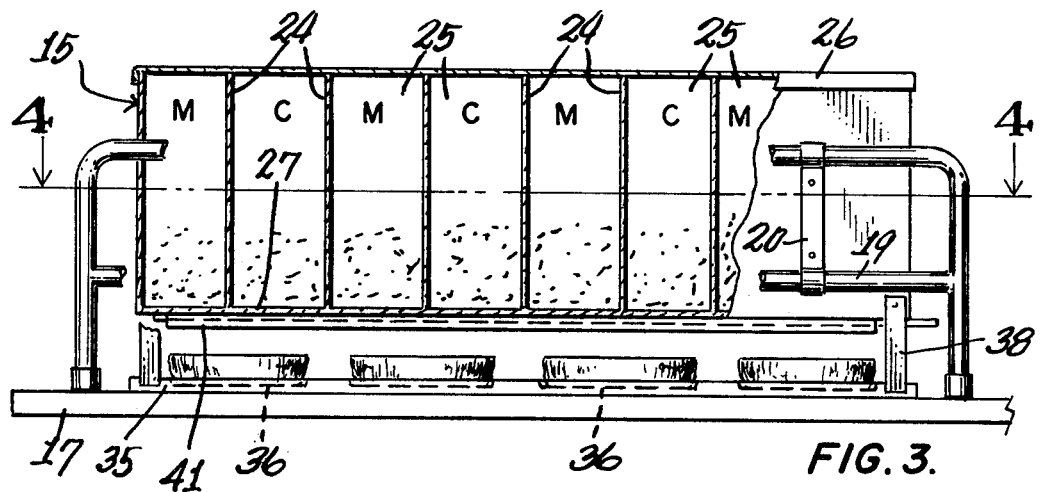
FIG. 3 is a side elevational view of the apparatus, parts being broken away to illustrate interior construction.

As seen in FIGS. 1 through 3, our improved apparatus comprises a container 15 which may have an attractive finish, and is preferably formed of stainless steel or aluminum. A standard may support the container from a countertop 17 or the like. The standard, as herein shown, comprises a pair of tubular members 18 on opposite sides of the container, the members having angular portions on opposite ends to provide supporting feet. Cross tubes 19 are connected across the feet of each tubular member, and brackets 20 support the container from the cross tubes.

The container 15 has cross-partitions 24 dividing it into separate upright compartments 25. The container is open at its upper end and this opening is closed by a cover 26 which fits in somewhat air-tight manner. The container is closed at its lower end by a bottom wall 27.

In the disclosed embodiment there are seven cross-partitions 24 to provide eight upright compartments 25. Mustard and catsup, identified by the letters "M" and "C" are disposed in alternate compartments. Each compartment for mustard has holes 30 in the bottom wall 27 to provide for dispensing of the mustard. Each compartment for catsup has holes 32 in the bottom wall 27 to provide for dispensing of catsup. The holes 30, 32 are closely paired on opposite sides of the cross-partitions and arranged for dispensing of mustard or catsup, or both, upon a dozen buns B which are arranged in predetermined manner upon a tray 35 carried on the counter top 17 in position underneath the container 15.

The tray 35 may have recesses 36 therein to aid in quickly locating the buns in predetermined manner on the tray. Side guides 37 mounted on the counter top 17 are adapted to locate a tray with respect to the longitudinal length of the container, and resilient stops 38 may be provided to properly locate a tray in a transverse direction of the container.

As seen in FIG. 1, buns B may be loaded on a tray 35, ready to be positioned beneath the container 15, after a tray 35 already properly positioned has its buns treated with mustard and catsup. FIG. 1 also shows a tray 35 which has left its position underneath the housing, with mustard and catsup deposited on the buns B. It will be appreciated that prepared hamburger patties may be deposited on the buns before they are positioned beneath the container 15, so that the mustard and catsup may be deposited thereon. The tray to the left in FIG. 1 may be pushed so that it engages the tray disposed beneath the container and pushes the latter from position, the yieldable stops 38 permitting this action. Thus, with a minimum of help, a great number of buns may be treated with mustard and catsup in a very short order.

With particular reference to FIGS. 7 through 11, a slide plate 40 is disposed flatwise against the flat undersurface of the container bottom wall 27, to control flow of mustard and catsup from the upright compartments. The plate is held for proper sliding action by side guides 41 (see FIGS. 2 and 3) carried by the container 15.

Figure 8:
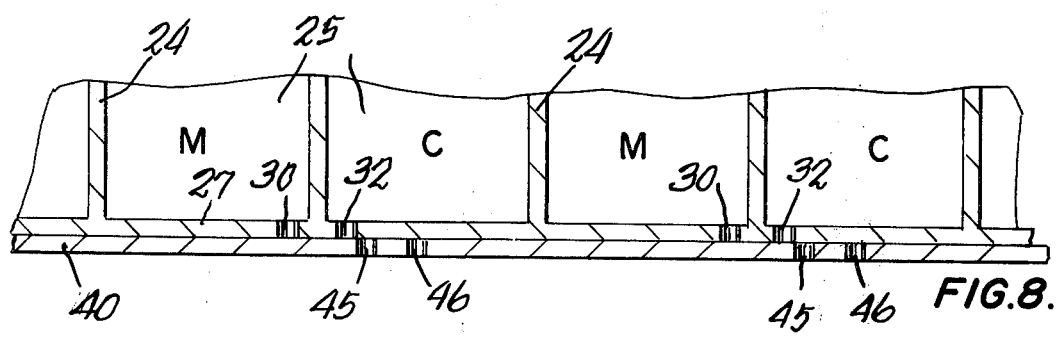
FIGS. 8 through 11 are enlarged, fragmentary sectional views showing various positions of the slide valve.
Figure 9:
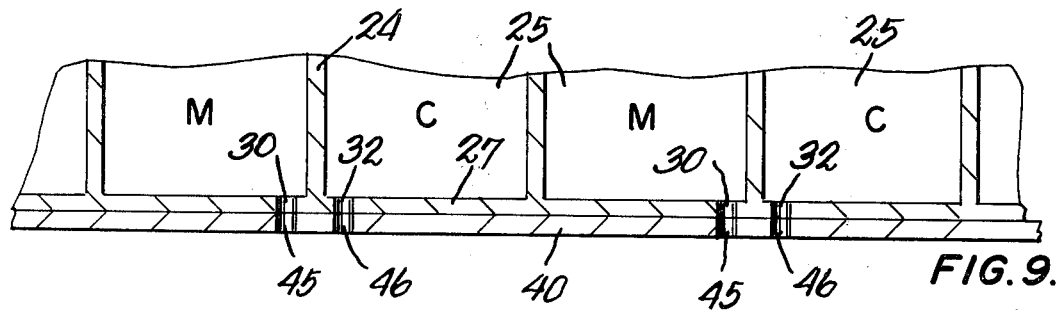
Figure 10:
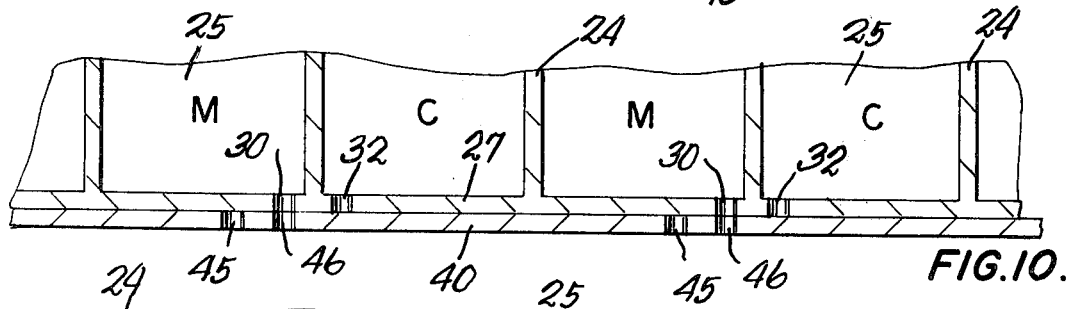
Figure 11:
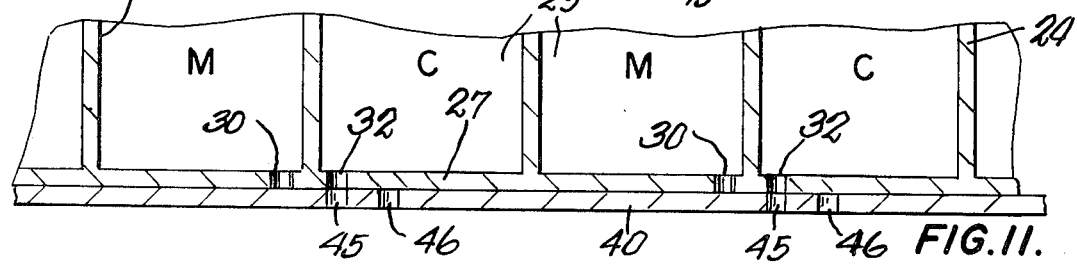

The slide plate 40 has paired openings 45,46 in correspondence with the paired openings 30 and 32 in the upright compartments. As seen in FIG. 8, all of the slide plate openings 45,46 are out of alignment with all of the compartment openings 30,32, and therefore no mustard or catsup may be dispensed. In FIG. 9, the slide plate openings 45,46 are in alignment with all compartment openings and therefor both mustard and catsup will be dispensed. In FIG. 10, only the slide plate openings 46 are aligned with the compartment openings 30 and therefore only mustard will be dispensed. In FIG. 11, only the slide plate openings 45 are aligned with the compartment openings 32 and therefore only catsup will be dispensed.

Figure 13:
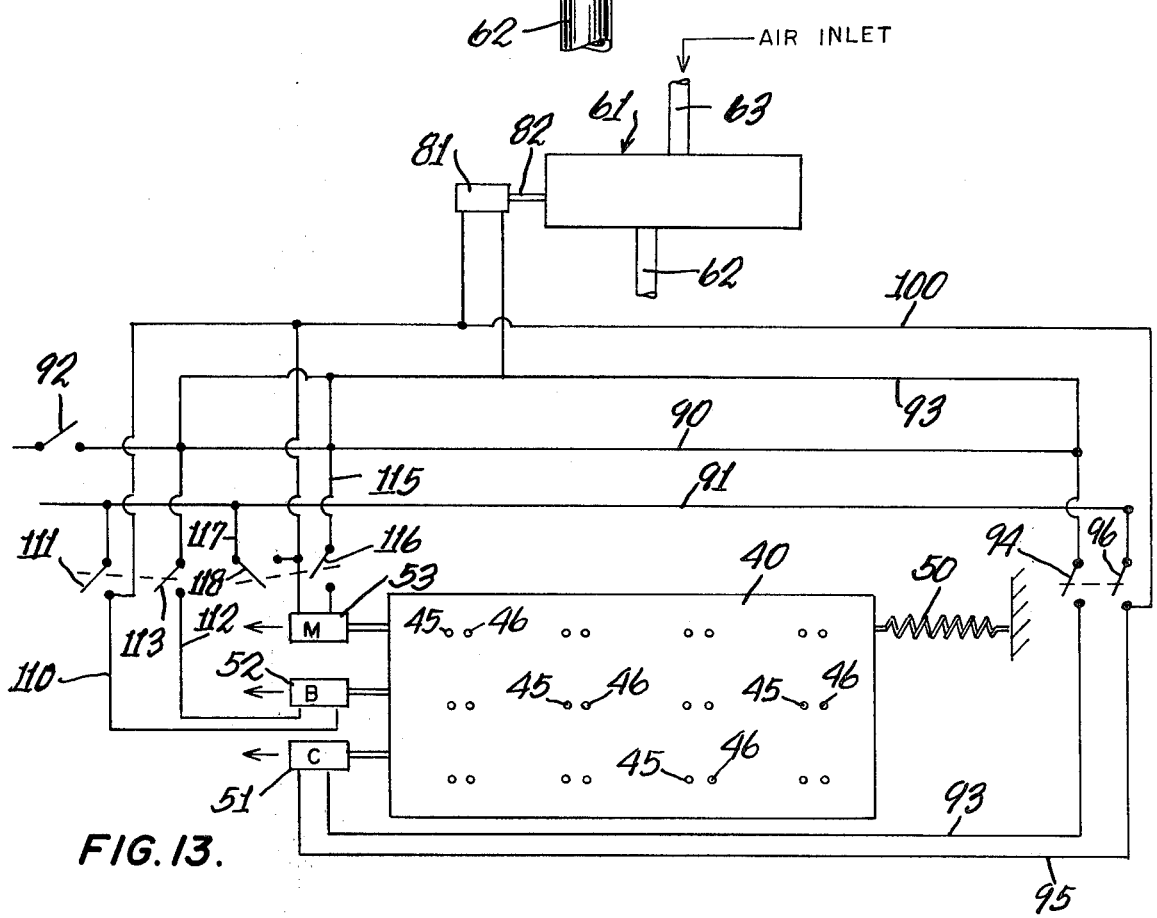
FIG. 13 is a schematic view showing various controls and the electrical wiring therefor.
Figure 14:
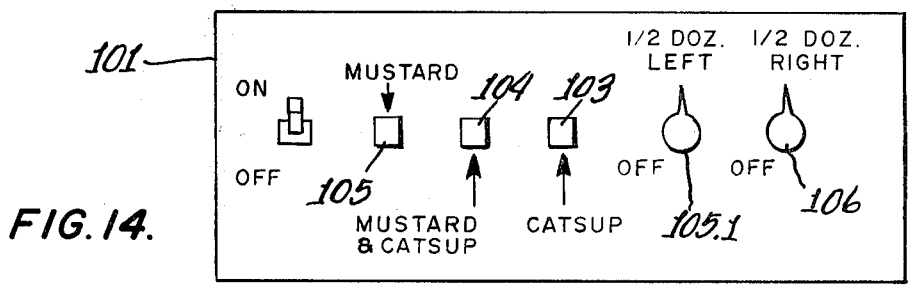
FIG. 14 is an elevational view of a control panel.

Reference is made to the schematic view shown in FIG. 13 for means to properly shift the slide plate 40 to selected positions. A spring 50 is shown with opposite ends connected to the plate and a stationary support to yieldably hold the plate in the fully closed position shown in FIG. 8. It will be appreciated that means other than a spring may be employed for this purpose.

A solenoid 51 has its plunger connected to the slide 40 and this plunger is limited to a predetermined amount of travel so that when the solenoid coil is energized, the plunger will pull the slide plate to the position shown in FIG. 11 to provide for dispensing of catsup only.

A second solenoid 52 also has its plunger connected to the slide plate 40, and this plunger is limited to a predetermined amount of travel which is somewhat greater than that of the plunger of solenoid 51. When the coil of solenoid 52 is energized, its plunger will pull the slide plate to the position shown in FIG. 9, to provide for dispensing of both mustard and catsup.

A third solenoid 53 also has its plunger connected to the slide plate 40 and this plunger has a greater amount of travel so that when its coil is enerized, its plunger will pull the slide plate to the position shown in FIG. 10, to provide for dispensing of mustard only. The solenoids 51 and 52 are so constructed and arranged that when their coils are not energized, the limiting stops for their plungers are inoperative so as not to interfere with movement of the slide plate 40 to the extreme position of FIG. 10. When all solenoid coils are deenergized, the slide plate will be returned to its fully closed position shown in FIG. 8 by the spring 50.

Figure 7:
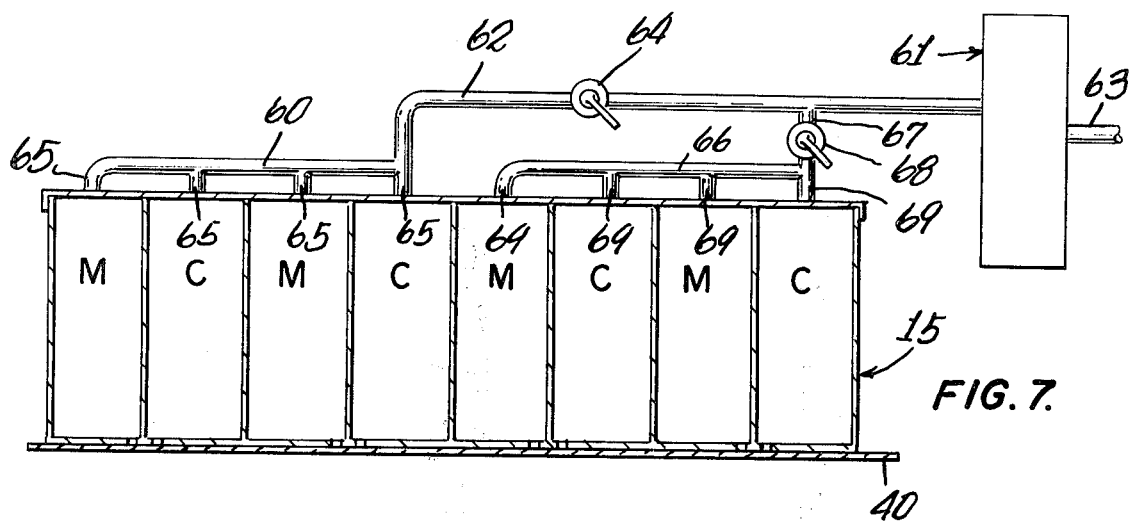
FIG. 7 is a somewhat schmatic view showing mustard and catsup compartments and certain controls connected thereto.

Since mustard and catsup are pasty substances, they will not flow freely by gravity from their respective compartments, and therefore it is preferred to employ means to force the same out of the compartments when the slide plate so permits. As before pointed out, the cover 26 fits the top of the container 15 in substantially airtight manner. With particular reference to FIG. 7, a manifold 60 is connected to a control valve 61 by a conduit 62. The valve is connected to a suitable source of air under pressure by a conduit 63, which source is not shown but may be a conventional tank containing compressed air. A rotary valve 64 is inserted within the conduit 62 to control flow of air to the manifold 60. Stub conduits 65 connect the first four left hand compartments to the manifold 60.

A second manifold 66 is connected to the conduit 62 in advance of the valve 64 by means of a conduit 67, and a rotary valve 68 is inserted within this latter conduit. Stub conduits 69 connect the manifold 66 with the four right hand compartments. Control valve 68 may be manually or mechanically or electrically closed to prevent air from reaching the manifold 66 and the compartments in communication therewith. Likewise, control valve 64 may be closed to prevent air from reaching the manifold 60 and the compartments in communication therewith. Thus air may be delivered to all compartments when both valves 64,68 are open, or to selected compartments by closing one or the other of the valves 64,68.

Figure 12:
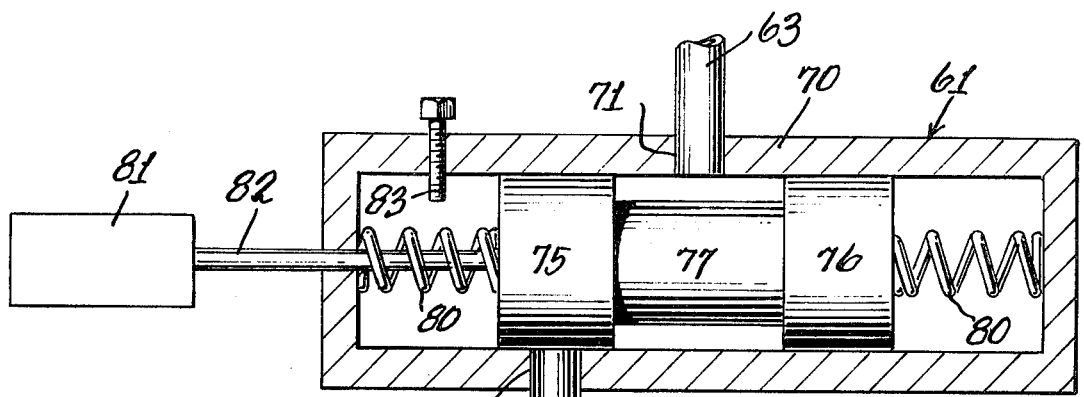
FIG. 12 is an enlarged, sectional view through an air control valve.

The air valve 61 is best seen in FIG. 12 and comprises a housing 70 having offset ports 71 and 72. The air inlet conduit 63 is connected to port 71 and the air delivery conduit 62 is connected to port 72. A valve spool is adapted to reciprocate within the housing and is formed with heads 75 and 76 connected by an undercut intermediate portion 77.

The valve spool is held in the centered position shown in FIG. 12 by a pair of coil springs 80 bearing against respective heads 75,76. In centered position, the valve head 75 blocks flow of air to the delivery conduit 62. A solenoid 81 carried by a suitable stationary part of the apparatus has its plunger 82 connected to the spool head 75. When the coil of the solenoid 81 is energized, the plunger 82 will pull the spool to the left until the head 75 abuts a stop 83. In this position, the head 75 uncovers the port 72 and the head 76 stops short of covering the port 71, so that compressed air may flow from the air inlet conduit 63 to the air delivery conduit 62 and thereby to the manifolds 60 and 66.

Again referring to FIG. 13, electrical energy is supplied from a suitable source to lines 90, 91. These lines may be connected to an electrical cord which has a plug on the end thereof and which plug may be inserted into a convenient wall outlet. A switch 92 is inserted in the line 90 to control power supply.

The line 90 is connected to one terminal of the solenoid 51 by a conductor 93 and a switch 94 is inserted in this line. The opposite terminal of the solenoid 51 is connected to power line 91 by a conductor 95 and a switch 96 is inserted in the latter conductor. The conductor 93 is also connected to one terminal of the solenoid 81, and the opposite terminal of this solenoid is connected by a conductor 100 to a terminal of switch 96 to which the line 95 is also connected. The switches 94 and 96 are ganged so that they operate in unison.

The soucre control switch 92 may be of the on-off toggle type and may be mounted on a control panel 101 which is disposed in any suitable place for easy access by the operator of the apparatus. Three push button operators 103, 104 and 105 may also be mounted on the control panel, as well as two rotaty knobs 105.1 and 106. The push button 103 operates the switches 94, 96, and is of the type that closes such switches only when pressure is applied to push the button inward. When pressure is released, the button 103 is spring-returned to its outer position to open the switches 94, 96.

Accordingly, when the push button 103 is pressed inwardly, the switches 94 and 96 are closed. This causes the source current to simultaneously energize the coils of both solenoids 51 and 81. Energization of solenoid 51 will pull the slide plate 40 to the position shown in FIG. 11 to provide for dispensing of catsup only, and energization of the solenoid 81 will cause a pulse of air to be applied to the compartments which are in communication with such air. As long as the push button 103 is held in, catsup will be dispensed and therefore the amount of catsup to be applied to the buns may be controlled by the duration of time the push button 103 is depressed.

The source line 91 is connected to one terminal of solenoid 52 by a conductor 110, as switch 111 being inserted in this conductor. The opposite terminal of solenoid 52 is connected to source line 90 by a conductor 112, a switch 113, being inserted in this conductor. Thus, when push button 104 is pressed inwardly, the switches 111, 113 (which are ganged) will energize solenoids 52 and 81. Solenoid 52 will pull slide plate 40 to the position shown in FIG. 9 and solenoid 81 will provide for flow of compressed air to the compartments 25, whereby both mustard and catsup will be dispensed.

The source line 90 is connected to one terminal of solenoid 53 by conductor 115, a switch 116 being interposed in this conductor. The other terminal of the solenoid 53 is connected to source line 91 by a conductor 117, a switch 118 being interposed in this conductor. Thus, when push button 105 is depressed, the ganged switches 116, 118 will be closed to energize solenoids 53 and 81. Solenoid 53 will pull slide plate 40 to the position shown in FIG. 10 and solenoid 81 will provide for flow of air to the compartments 25, whereby mustard only will be dispensed.

Figure 4:
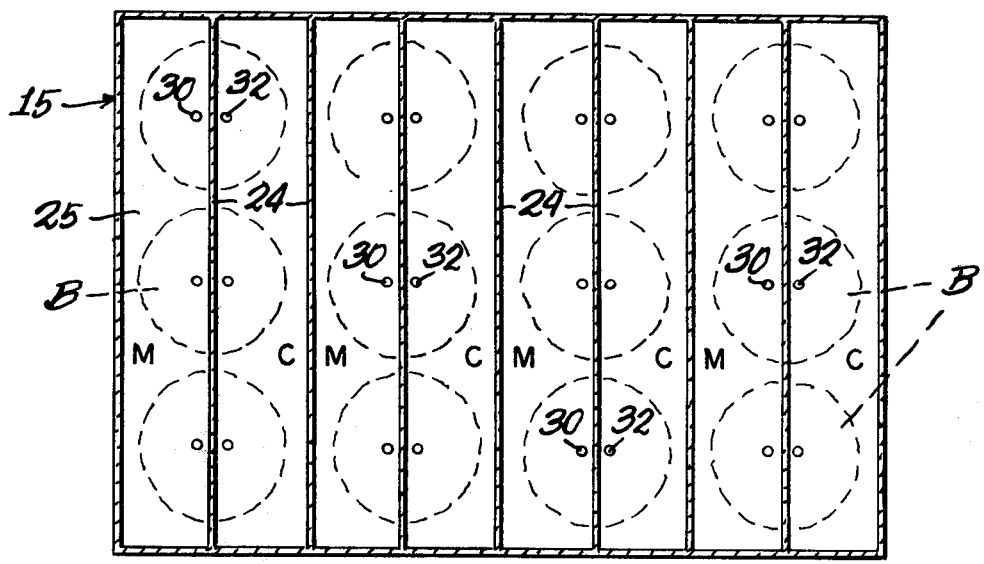
FIG. 4 is a transverse sectional view corresponding to the line 4—4 of FIG. 3, with the support stand omitted.
Figure 5:
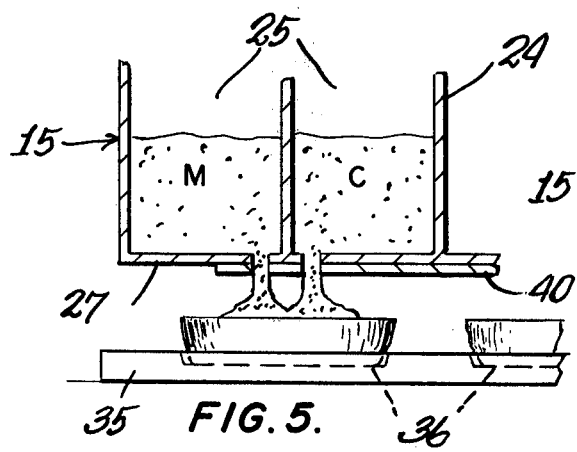
FIGS. 5 and 6 are similar fragmentary sectional views, the former showing mustard and catsup being ejected from respective compartments and onto a bun, and the latter showing a slide valve in position to interrupt the dispensing operation.
Figure 6:
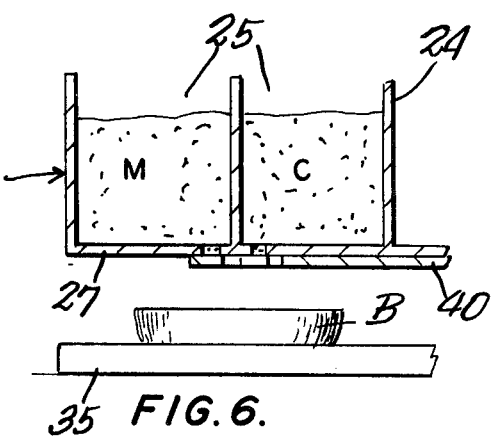

The knobs 75 and 76 may have a flexible connection (something like a speedometer cable) with respective air control valves 64, 68 and by selective control may provide for the dispensing of the pasty substance to left hand half dozen buns (with respect to FIG. 4), or the right hand half dozen, or to the full dozen.

We claim:

1. Apparatus for dispensing pasty flowable substances such as mustard and catsup onto edible articles such as hamburger buns, comprising:

a tray for a plurality of said articles, a container having two separate adjoining compartments, one containing a flowable pasty substance such as mustard, and the other containing a different flowable pasty substance such as catsup, each compartment having an opening in a bottom wall thereof with said openings in juxtaposition, said container being disposed in position with said bottom walls above and spaced from said tray and the tray being movable relative to said container to align a said article with both said openings in said two compartments, and valve means controlling flow of said substances through said juxtaposed openings, said valve means being constructed and arranged to control said compartment openings to selectively provide for dispensing of one or the other of said substances or both at the same time and counter top support means attached to said container for supporting the container above a counter top, said counter top support means comprising spaced support feet for allowing said tray to pass therethrough.

2. Apparatus according to claim 1 and further including means acting on the substance in each compartment to force said substance through said compartment opening when said valve means provides for flow therethrough.

* * * * *